United States Patent [19]

Hässler

[11] Patent Number: 4,523,907

[45] Date of Patent: Jun. 18, 1985

[54] HOLDER AND METHOD OF FIRING CERAMIC BRIQUETTES

[76] Inventor: Andreas Hässler, Jahnstrasse 46, D-7904 Erbach, Fed. Rep. of Germany

[21] Appl. No.: 433,138

[22] PCT Filed: Mar. 10, 1982

[86] PCT No.: PCT/DE82/00050

§ 371 Date: Sep. 28, 1982

§ 102(e) Date: Sep. 28, 1982

[87] PCT Pub. No.: WO82/03118

PCT Pub. Date: Sep. 16, 1982

[30] Foreign Application Priority Data

Mar. 11, 1981 [DE] Fed. Rep. of Germany ....... 3109146
Jan. 29, 1982 [DE] Fed. Rep. of Germany ....... 3202909
Feb. 8, 1982 [DE] Fed. Rep. of Germany ....... 3204233

[51] Int. Cl.³ .......................... F27D 5/00; F23D 3/40
[52] U.S. Cl. .................................... 432/258; 110/195; 431/7; 431/170
[58] Field of Search ............... 432/231, 232, 258, 259; 431/7, 170; 110/195

[56] References Cited

U.S. PATENT DOCUMENTS 1,146,424 7/1915 Graves et al. ...................... 432/231
1,906,785 5/1933 Bandini ................................ 264/57
3,033,191 5/1962 Bonadiman ........................ 110/171
3,988,107 10/1976 Koch ................................... 432/258

FOREIGN PATENT DOCUMENTS 2026267 5/1970 Fed. Rep. of Germany ...... 432/258

Primary Examiner—John J. Camby
Attorney, Agent, or Firm—Pollock, Vande Sande and Priddy

[57] ABSTRACT

Diverse ceramic briquettes, for example clay tiles, are fired in holders which are stacked on top of one another on a firing conveyor. Firing takes place in a tunnel kiln which is primarily heated with gas or oil. Firing with solid fuel has the disadvantage that the firing conveyor is heavily dirtied. With the new holder according to the invention, the holder floor is filled with solid fuel and thereafter the briquettes are put in. This holder and the method used for firing permit a clean firing without dirtying the kiln and without high dust emission.

8 Claims, 8 Drawing Figures

HOLDER AND METHOD OF FIRING CERAMIC BRIQUETTES

TECHNICAL FIELD

The invention concerns a holder for firing ceramic briquettes, especially clay tiles, and a method for firing the ceramic briquettes in these holders.

BACKGROUND ART

Holders for firing ceramic briquettes are known in various forms. The holders, which accommodate the ceramic, mostly platelike, briquettes are stacked on top of one another on a firing conveyor. The firing of ceramic briquettes in this type of holder has, up until now, primarily taken place in tunnel kilns with gas or oil firing. In firing the tunnel kiln with solid fuel, it is also already known to blow fine coal or coal dust into the tunnel kiln. This leads to an undesirably high dust emission and to an equally undesirable dirtying of the firing conveyor.

THE INVENTION

The object of the invention is to devise a holder for firing ceramic briquettes with solid fuel as well as a method for firing ceramic briquettes in such a holder. The new holder and the new method should avoid the disadvantages of the previously known method of firing with solid fuel and enable a clean heating of the tunnel kiln with solid fuel without dirtying the firing conveyor and without dust emission. In addition, it should be possible to distribute the fuel in the kiln area according to the different heating needs over the breadth of the kiln. In addition, it should be possible also to use lower quality fuel.

The resolution of this problem takes place according to the invention in that solid fuel is arranged between the floor of the holder and the briquettes.

It is thereby expedient to provide depressions in the floors of the holders for holding the solid fuel.

Further, it is proposed that seating areas for the briquettes be provided over the solid fuel.

Before placing the briquettes in the holders, the holders are first filled with solid fuel and then the briquettes are arranged in the holders. Finally, the holders filled with fuel and briquettes are stacked on top of and next to each other on the firing conveyor.

Via a predetermined filling of the holders with coal, it is possible to provide larger quantities of fuel, for example in the bottom row of holders, where the heat requirements are necessarily greater than in the upper rows. Therefore, distribution of the fuel can be targeted to the special heating needs of the specific holders.

By using these holders, the ceramic tiles as well as the firing conveyor remain ash-free, and it is possible to supply the entire amount of fuel necessary for firing exclusively by filling the holders. To remove the ashes, it is sufficient, after removing the fired briquettes, to top over the rack so that the ashes fall out. If required, additional cleaning apparatuses, for example rotary brushes or vacuum equipment, can be utilized.

As the briquettes are grouped together in rows in the holders, the spaces between them create good air access for burning the coal in the racks. For a heat requirement of about 1200 kJ/kg of burned material, for example, it is sufficient to spread the fuel in a layer of a few centimeters in depth.

When using gas-rich solid fuel, it is advantageous to operate the tunnel kiln according to the method of German Pat. No. 26 43 406 published Oct. 11, 1979, granted Feb. 4, 1980.

Using this firing method results in the unburned, escaped volatile fuel particles in the heating area being still burned up when passing back through the firing zone.

According to a further feature of the invention, the separator pieces of the holders are formed as individual pieces.

It has been shown to be an advantage to construct the holders, in cross-section, U-shaped, L-shaped or H-shaped.

It is also advantageous to form the seating area for the briquettes of perforated or profiled plates.

Such perforated or profiled plates function as a supporting element and as an intermediate cover for the fuel.

Through the provision of such plates, the fuel is indirectly heated and, depending upon the requirements, the intermediate cover can be so constructed that none of the heating gases or predetermined portions of heating gases can force through.

According to a further object of the invention, the method of firing the ceramic briquettes in the holders according to the invention is characterized in that filling with the solid fuel in one cycle of the holder takes place between a loading and unloading station.

Before being filled with solid fuel, the holders are, one at a time, emptied of fuel by tipping and, when appropriate, cleaned.

Furthermore, it is practical that at least some of the holders be filled with more fuel than is required for firing in these holders. With the excess heating, a further ceramic product can be fired at the same time. The additional fired article can be any type of ceramic product. For example, it is possible to stack the holders which have an excess supply of fuel on a firing conveyor and to load one or more additional firing conveyors with briquettes which have not been arranged in holders. It is also possible to utilize the excess heat outside the kiln.

Finally, according to the invention, it is further suggested that with diverse holders, differing proportions of fuel and/or qualities of fuel be distributed. The selection of the quantity of fuel and/or quality of fuel can thereby take place depending upon the prevailing required heating needs.

BRIEF DESCRIPTION OF THE DRAWINGS

The following preferred embodiments of the invention are described according to the Figures. They show.

BEST MODE FOR CARRYING OUT THE INVENTION

Figure 1:
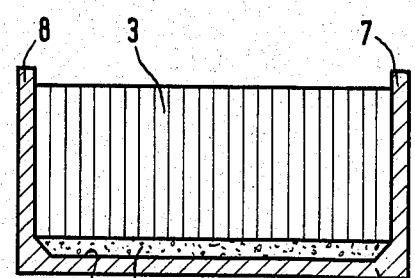
FIG. 1—a side view of a first embodiment of a holder.

In the various drawing figures, the parts corresponding to one another are represented by the same reference numerals. In the different embodiments, different numbers of prime designations are used. The description proceeds essentially according to the embodiments of FIGS. 1 to 3.

A holder 1 has a floor 2. In the holder floor 2 there is a trough-shaped depression 5 which serves to hold the solid fuel 4, for example to hold granulated coal. The briquettes rest on a seating area 6 at a distance above the solid fuel layer 4.

In the embodiment of FIG. 1, the holder 1 has a U-shaped form. The side pieces which extend upwards serve as separator pieces 7 and 8 which carry the rack stacked on top.

Figure 4:
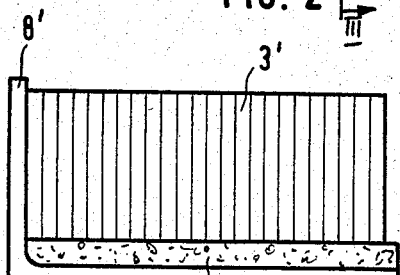
FIG. 4—a side view of a second embodiment of the holder.
Figure 6:
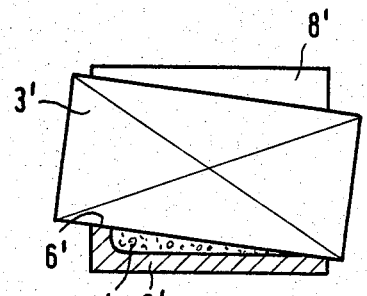
FIG. 6—a section along line VI—VI of FIG. 5.
Figure 5:
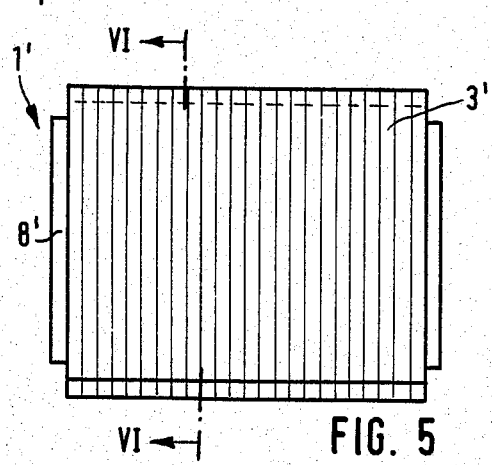
FIG. 5—a plan view of the holder according to FIG. 4.

In the embodiment according to FIGS. 4 to 6, the holder has a somewhat L-shaped form. In this holder, the briquettes are arranged at a slant. They also rest on a seating area 6'. Above the holder floor 2' is the solid fuel 4. The separator piece 8' is seen to be on a front end of the holder.

Figure 3:
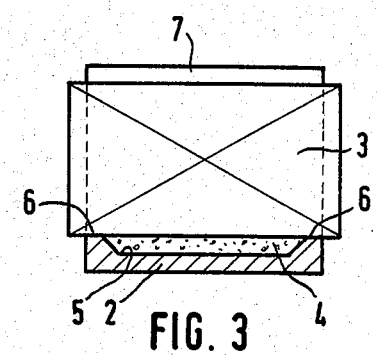
FIG. 3—a section through the holder along line III—III in FIG. 2.
Figure 2:
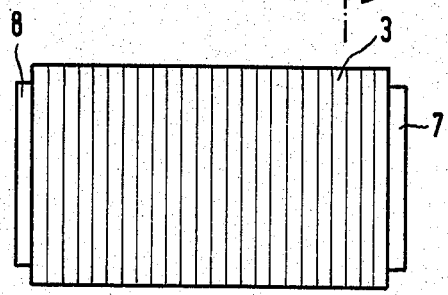
FIG. 2—a plan view of the holder according to FIG. 1.
Figure 7:
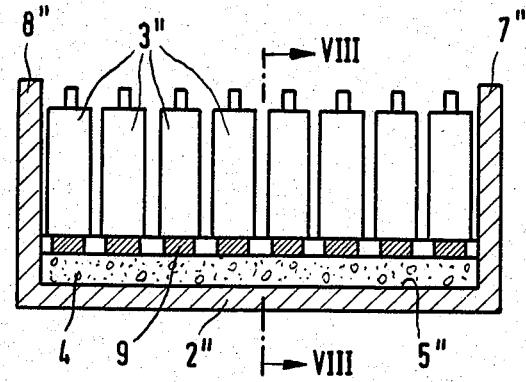
FIG. 7—a longitudinal section through a third embodiment with seating plate.
Figure 8:
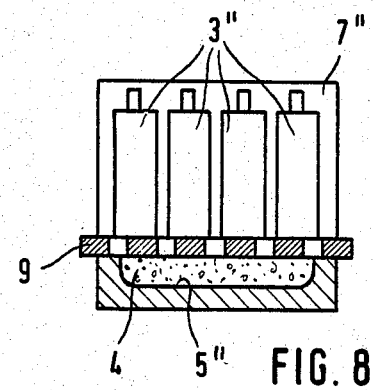
FIG. 8—a cross-section along line VIII—VIII in FIG. 7.

The embodiment according to FIGS. 7 and 8 has a form very similar to the embodiments according to FIGS. 1 to 3 and is also U-shaped. The solid fuel 4 is in a depression 5" in the holder floor 2". A perforated plate 9 rests on the edges of the depression 5" and carries the briquettes 3". The separator pieces 7" and 8" are arranged on the opposing ends of the holder.

I claim:

1. A holder for firing ceramic briquettes, in particular clay tiles, the holder having a floor, at least one separator piece extending upwards from said floor for permitting a plurality of such holders to be stacked upon one another when the briquettes in such holders are being fired, means for supporting a plurality of briquettes in said holder in spaced relation to the holder floor, and a quantity of solid fuel situated in the space between the holder floor and the said briquettes for generating the heat required to effect the firing of said briquettes.

2. A holder according to claim 1, characterized in that there are depressions in the holder floor for holding said solid fuel.

3. A holder according to claims 1 or 2, wherein said supporting means comprise seating areas for the briquettes which are integral with the holder and extend upwardly from the holder floor to a location above the solid fuel.

4. A holder according to one of claims 1 or 2, characterized in that the separator piece is a removable piece.

5. A holder according to one of claims 1 or 2, characterized in that the holder is U-shaped in cross-section.

6. A holder according to one of claims 1 or 2, characterized in that the holder is L-shaped in cross-section.

7. A holder according to one of claims 1 or 2, characterized in that the supporting means is a perforated plate.

8. A holder according to one of claims 1 or 2, characterized in that the supporting means is a profiled plate.

* * * * *